(12) United States Patent
Rossi

(10) Patent No.: US 8,720,904 B2
(45) Date of Patent: May 13, 2014

(54) STATIC SEALING DEVICE FOR WHEEL HUB ASSEMBLIES CONNECTED TO CONSTANT VELOCITY JOINTS

(75) Inventor: Marcello Rossi, Turin (IT)

(73) Assignee: Aktiebolaget SKF, Gothenburg (SE)

( * ) Notice: Subject to any disclaimer, the term of this patent is extended or adjusted under 35 U.S.C. 154(b) by 1 day.

(21) Appl. No.: 13/525,948

(22) Filed: Jun. 18, 2012

(65) Prior Publication Data

US 2013/0001888 A1 Jan. 3, 2013

(30) Foreign Application Priority Data

Jun. 29, 2011 (IT) .............................. TO2011A0574

(51) Int. Cl.
*F16C 33/78* (2006.01)
(52) U.S. Cl.
USPC ............................ 277/572; 277/571; 277/549
(58) Field of Classification Search
USPC ........................................ 277/549, 571, 572
See application file for complete search history.

(56) References Cited

U.S. PATENT DOCUMENTS

| | | | | |
|---|---|---|---|---|
| 5,975,767 A | * | 11/1999 | Mizukoshi et al. | 384/544 |
| 6,974,136 B2 | * | 12/2005 | Vignotto et al. | 277/549 |
| 7,628,541 B2 | * | 12/2009 | Vignotto et al. | 384/477 |
| 7,675,212 B2 | * | 3/2010 | Kobayashi | 310/90.5 |

FOREIGN PATENT DOCUMENTS

| | | |
|---|---|---|
| EP | 2042755 A2 | 4/2009 |
| WO | WO2008006339 A1 | 1/2008 |
| WO | WO2009140996 A1 | 11/2009 |

* cited by examiner

*Primary Examiner* — Gilbert Lee
(74) *Attorney, Agent, or Firm* — Bryan Peckjian; SKF USA Inc. Patent Department

(57) ABSTRACT

A static sealing device for a wheel hub assembly, an inner ring operatively associated with a constant velocity joint, an outer ring coupled with the wheel hub, including a first sealing assembly arranged between the inner ring and an outer ring for protecting respective rolling bodies, and a second sealing assembly integrally carried by the inner ring, arranged straddling the wheel hub and the outer ring of the joint; wherein the first sealing assembly includes a shield anchored to the inner ring of the bearing and provided, on the first side of the joint, with a flange portion carrying an annular signal generating element towards the joint which leaves an annular radially inner area of the flange portion uncovered, defining an annular seat between it and the inner ring in which an edge radially folded on the outside of a tubular core of the second sealing assembly is coupled.

10 Claims, 1 Drawing Sheet

STATIC SEALING DEVICE FOR WHEEL HUB ASSEMBLIES CONNECTED TO CONSTANT VELOCITY JOINTS

CROSS-REFERENCE TO RELATED APPLICATION

This United States Non-Provisional Utility application claims the benefit of copending Italy Provisional Patent Application Serial No. TO2011A000574, filed on Jun. 29, 2011, which is incorporated herein in its entirety.

FIELD OF THE INVENTION

The present invention relates to a static sealing device for wheel hub assemblies connected to constant velocity joints.

BACKGROUND OF THE INVENTION

Wheel hub assemblies support a vehicle wheel on one side and if the wheel is driving, they are angularly connected to a relative constant velocity joint for transmitting the driving torque from the axle shaft to the wheel itself. Wheel hub assemblies have an axis A of rotation and comprise an inner ring and an outer ring coaxial to each other and to axis A of rotation and rotatable with respect to each other by the arrangement of a crown of rolling bodies therebetween.

The inner ring is a flanged inner ring for allowing a wheel to be attached to the assembly and comprises:
  a flange crosswise axis A of rotation,
  an axle extending along axis A of rotation and made integral with and of the same material as the flange, and
  an insert ring, which is axially mounted on the axle on the side opposite to the flange with respect to the axle itself, and is axially locked against a shoulder of the axle by a rolled edge.

The transmission of the driving torque from the constant velocity joint to the wheel hub is ensured by conjugate motion transmission toothed means provided on the adjacent and facing ends of the wheel hub and of the outer ring of the constant velocity joint; the toothed means may consist of a typical splined coupling or a pair of front toothings that couple to each other head to head, as shown in WO2009/140996, in EP2042755, or again in WO2008/006339.

In particular, in the case of provision of front toothings, the junction zone between wheel hub and constant velocity joint must be protected against infiltrations of external contaminants (water, dust, mud, dirt); the same applies to the rolling bodies mounted arranged between the inner ring and the outer ring which is provided with the fixing means to the suspension upright.

Such protection is obtained according to WO2008/006339 by a single sealing assembly made of two opposite shields, a first one fixed onto the inner ring of the bearing, on the side facing the constant velocity joint, and a second one fixed to the outer ring of the bearing and carrying a sealing ring provided with one or more sliding lips which cooperate in contact with the first shield. The first shield has a complex shape obtained by a dual fold, so that a sleeve portion thereof extends so as to protrude from the inner ring of the bearing and towards the outer ring of the constant velocity joint, covering the junction zone. This protruding portion may be provided, at least at the free end thereof, with an annular seal which frontally cooperates with the outer ring of the constant velocity joint; moreover, the protruding portion or the face of a flange portion of the first shield, facing in use the constant velocity joint, may be provided with an annular signal generating element (also called "phonic wheel") consisting, if the shield is made of a ferromagnetic metal material, of an alternation of projections and depressions, or of an annular sealing portion made of a magnetizable elastomeric material, magnetized so as to have an alternation of magnetized and non-magnetized zones, or of zones having opposite polarities. Once in use coupled with a suitable sensor, the rotation of the "phonic wheel", which according to what said is integral with the inner bearing ring, generates a signal that serves for detecting the rotation speed of the vehicle wheel.

The solution according to WO2008/006339 is expensive, complex to manufacture and produces large overall dimensions, both in radial and in axial directions.

In the case of WO2009/140996, the first shield has a simple L-shape in radial section and carries the signal generating element on the flange portion thereof; the protection of the junction zone is carried out by a second sealing assembly, separate from and adjacent to the sealing assembly arranged to protect the rolling bodies, mounted fitted, through a tubular core thereof, onto the outer lateral surface of the inner bearing ring; at the free end thereof, the tubular core carries an annular sleeve seal which makes a radial seal on the outer ring of the joint. This solution greatly increases the axial dimensions of the bearing since the inner ring of the same must be made adequately long for allowing the separate fitting of both sealing assemblies. Moreover, in order to obtain the fitting of the second sealing assembly it is preferable to have a shoulder available to the same whereon the thrust required in the mounting step is exerted. This should be obtained on the core towards the zone of the free end thereof, at the end of the fitting zone on the inner ring which is therefore subject to peak load in the mounting step and may easily get deformed.

EP2042755 teaches a similar solution in which, however, the second sealing assembly is carried either by the outer ring of the constant velocity joint and has a seal that frontally cooperates with the inner bearing ring, or it is carried by the inner bearing ring, on the same area intended to also receive the first sealing assembly, which is radially fitted on the outside of the core of the second sealing assembly. While this solution allows the axial dimensions to be reduced with respect to that of WO2009/140996, however it increases the radial dimensions. Moreover, correctly carrying out the mounting of the second sealing assembly, which necessarily has a quite long core in axial direction, without deformations may be difficult unless an end shoulder is obtained on the same towards the flange portion of the first shield of the first sealing assembly. However, this causes an interference problem with the signal generating element optionally carried by this flange portion.

The object of the present invention is to provide a static sealing device for wheel hub assemblies connected to constant velocity joints which is free from the above drawbacks, having low costs and high ease of manufacture, high protection efficiency on the rolling bodies and the coupling zone between joint and wheel hub and reduced axial and radial dimensions.

SUMMARY OF THE INVENTION

A static sealing device for wheel hub assemblies connected to constant velocity joints is thus provided according to the invention.

Accordingly. A first aspect of the invention provides a static seal device for wheel hubs connected to constant velocity joints comprising:
  a first sealing assembly interposed between an inner ring and an outer ring of the wheel hub, and a second sealing assembly integrally supported by the inner ring and arranged straddling the wheel hub and an outer ring of the constant velocity joint, and wherein the first sealing assembly has a first shield anchored to the inner ring by means of a sleeve portion and provided with a flange portion on a first side of the joint, which radially extends so as to protrude from the sleeve portion and towards the outer ring of the wheel hub, externally carrying a signal generating element towards the joint, the signal generating element consisting of an annular insert, and wherein the annular insert is shaped so as to leave uncovered an annular radially inner area of the flange portion, the annular radially inner area being immediately adjacent to a radially outer lateral surface of the inner ring on which the sleeve portion of the first shield and a second end of a tubular core of the second sealing assembly are fitted immediately adjacent to each other, and wherein the ring defines an annular seat frontally open towards the joint between itself, the uncovered annular area of the flange portion of the first shield, and the radially outer lateral surface of the inner ring, and wherein the first end of the tubular core of the second sealing assembly faces the opposite side of the joint and is provided radially on the outside with an L-shaped edge, shaped so as to be coupled within the annular seat substantially flushed with a face of the annular insert facing towards the joint.

BRIEF DESCRIPTION OF THE DRAWINGS

Further features and advantages of the present invention will be apparent from the following description of non-limiting embodiments thereof, made with reference to the figures in the accompanying drawings, wherein.

DETAILED DESCRIPTION OF THE INVENTION

Figure 1:
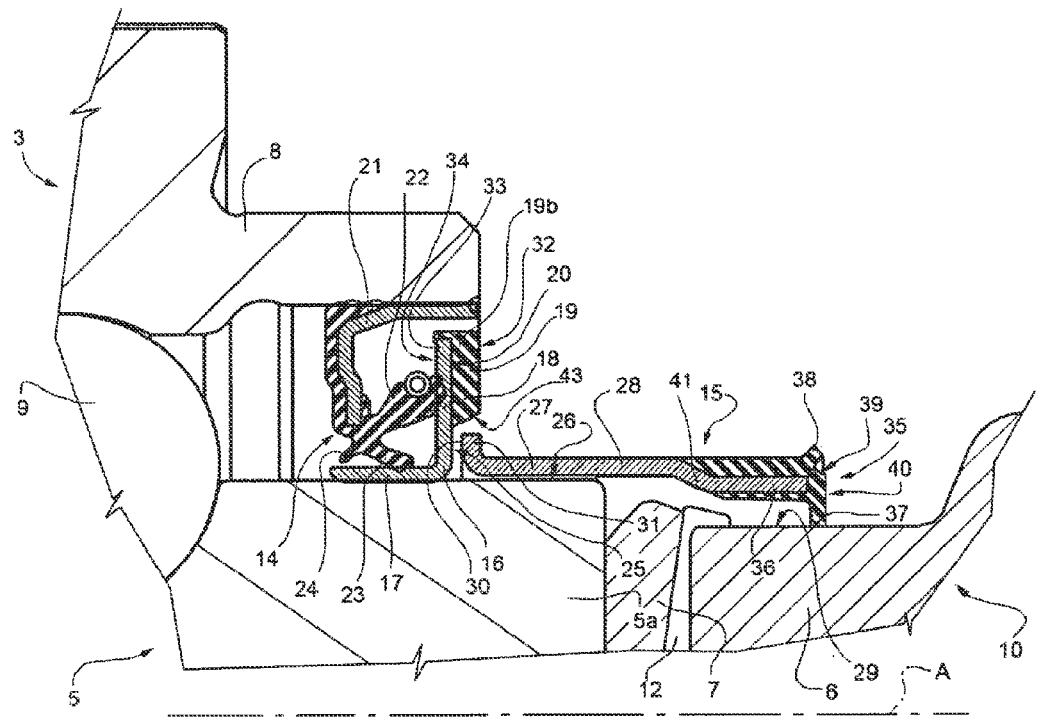
FIG. 1 schematically shows a longitudinal elevation radial section view of a static sealing device according to the invention applied to a wheel hub assembly connected to a constant velocity joint, only partially shown for the sake of simplicity.
Figure 2:
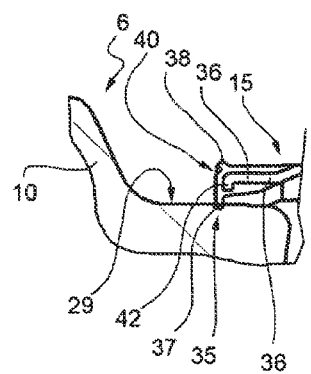
FIG. 2 schematically shows a radial section reduced scale view of a detail of a variant of the sealing device in FIG. 1.

With reference to FIGS. 1 and 2, reference numeral 1 globally denotes (FIG. 1) a static sealing device for a wheel hub assembly 3, an inner ring 5 of which is operatively associated with a constant velocity joint 6 for rotating integrally therewith. The wheel hub assembly 3 further comprises an outer ring 8 mounted coaxial and concentric with ring 5, radially on the outside of ring 5, and a plurality of rolling bodies 9 arranged between rings 5 and 8. The inner ring 5 comprises a ring 5a, made as an independent element axially locked by a rolled edge 7 and externally delimited by a cylindrical outer lateral surface 26, while the constant velocity joint 6 comprises an outer ring 10 provided with a cylindrical outer lateral surface 29 and with a front toothing 12 which engages with a similar front toothing, not shown for the sake of simplicity, obtained on the edge 7 on reciprocally adjacent portions 13 (FIG. 2) thereof.

The device 1 comprises a first sealing assembly 14 arranged between the inner ring 5 (in particular ring 5a) and the outer ring 8 to protect the rolling bodies 9, and a second sealing assembly 15 integrally carried by the inner ring 5 (in particular the ring 5a), arranged straddling the wheel hub 3 and the outer ring 10 of the joint 6.

The sealing assembly 14 comprises: two shields 16 and 21 arranged facing each other and fitted on the inner ring 5 and in the inner ring 8, respectively; and a plurality of annular lips 22, 23, 24 integral with the shield 21 and arranged in sliding contact with the shield 16.

The shield 16 is L-shaped in radial section and in turn comprises a sleeve portion 17 anchored onto the radially outer lateral surface 26 of the inner ring 5, and a flange portion 18, which radially extends so as to protrude on the outside from the sleeve portion 17 and towards the outer ring 8.

On a respective frontal surface 20 thereof facing towards joint 6, the flange portion 18 supports a signal generating element 19 defined by a flat annular insert 19b, which has a substantially trapezoidal radial section with constant axial thickness, and is made of a magnetizable elastomeric material which has been magnetized and anchored to the surface 20. The annular insert 19b has either a plurality of magnetized and non magnetized zones alternating with each other about axis A, or a plurality of magnetized zones with opposite polarity; once the annular element or insert 19b is operatively coupled with a sensor, known and not shown, such sensor emits a signal function of the rotation speed of ring 5.

According to a feature of the invention, the annular insert 19b is shaped so as to leave uncovered, on the surface 20, an annular radially inner area 25 of the flange portion 18 immediately adjacent to the radially outer lateral surface 26 of the inner ring 5 (in particular of the ring 5a), on which the sleeve portion 17 of the shield 16 and a first end 27 of a tubular core 28 of the second sealing assembly 15 are fitted in a position immediately adjacent to each other in axial direction. The insert 19b of magnetizable elastomeric material constituting the annular element 19 is then coupled and anchored to the surface 20 so as to wholly cover it except for said uncovered annular area 25.

The tubular core 28 is generally made of a pressed metal material and extends so as to axially protrude from the ring 5, coaxially to the ring 5, towards the joint 6 and around immediately adjacent portions of the wheel hub 3 and of the outer ring 10 of the joint 6 provided with the aforementioned reciprocally engaging front toothings, in particular up to the substantially cylindrical outer lateral surface 29 of the outer ring 10, normally arranged substantially coaxial with the ring 5.

According to the invention, due to its shape with reduced radial extension with respect to that of the flange portion 18, the annular element 19 defines between itself, the uncovered radially inner annular area 25 of the flange portion 18 and the radially outer lateral surface 26 of the inner ring 5, an annular seat 30 frontally open towards the joint 6 and therefore, towards the core 28, suitable for receiving a portion of end 27 of the core 28 therein, as will be seen.

According to the invention, in combination with such characteristic shape of the element 19, the end 27 of the core 28, which is facing the side opposite to the joint 6, is radially provided on the outside with an L-shaped edge 31 shaped so as to couple within the annular seat 30, substantially flushed with a face 32 of the ring 19 facing towards the joint 6. In particular, the L-shaped edge 31 is adapted to define a thrust shoulder for mounting the sealing assembly 15 on the inner ring 5 of the bearing 4. In this way, the shoulder defined by the folded edge 31 is carried by the end 27 of the core 28, which in use is facing the mounting direction, thus avoiding the application of any peak load to the core 28 in the mounting step. Moreover, once mounted, the edge 31 remains wholly included within the axial dimensions of the annular element 19 and therefore it produces no increase in the axial dimensions of the core 28.

In order to improve the signal generation, which in some cases may be not satisfactory due to the reduced radial extension of the element 19, the annular insert 19b extends in a radial direction immediately beyond a radially outer edge 33 (FIG. 1) delimiting the flange portion 18 of the shield 16 and in axial direction, by the entire thickness of the flange portion 18 and up to a second front surface 34 of the flange portion 18, opposite to the surface 20. In this way, the radially outer edge 33 of the flange portion 18 is embedded into the insert 19b.

In order to ensure the fluid-tightly protection of the adjacent portions of the inner ring 5 and of the joint 6 (with the relative front toothings), the end 27 of the tubular core 28 is fluid-tightly coupled, for example by interference fitting, with the radially outer lateral surface 26 of the inner ring 5, which also makes the core 28 angularly integral with the ring 5. Moreover, in addition to the tubular core 28, the sealing assembly 15 also comprises an annular seal 35 carried by a second end 36 of the tubular core 28, opposite to the end 27.

The seal 35 is made of an elastomeric material and in turn comprises at least a first elastically deformable annular lip 37 which radially extends so as to protrude from the second end 36, inwards of the core 28 and on the side opposite to the L-shaped edge 31 of the first end 27, up to intercepting with interference the substantially cylindrical outer lateral surface 29 of the outer ring 10 of the joint 6, for obtaining a sliding radial seal thereon.

The annular seal 35 further comprises a second annular lip 38, which radially extends in the oblique direction so as to protrude from the end 36, substantially on the side opposite to the annular lip 37 and in a position axially retracted towards the end 27 with respect to the lip 37, so as to delimit a frontal annular indentation 39 facing the joint 6 in the seal 35 and towards the lip 37, adapted to allow the lip 38 to serve as a centrifuging element with regards to possible contaminants approaching close to the lip 37.

In particular, the lip 38 is shorter than the lip 37 and extends in axial direction up to flushed with a lateral annular surface 40 which frontally delimits the lip 37 facing the side opposite to the inner ring 5. Moreover, the end 36 of the tubular core 28 has a smaller diameter than that of the end 28 and is connected to the first end 28 via an obliquely folded step portion 41 of the core 28, so as to increase the axial rigidity of the core 28 itself.

Such second end 36 of the tubular core 28 is wholly embedded into the annular seal 35. Moreover, according to the alternative embodiment in FIG. 2, the end 36 of the core 28 is radially provided on the inside of an L-shaped edge 42 which extends in a direction opposite and parallel to the L-shaped edge 31 of the end 27 and is embedded into the seal 35 parallel and in a position immediately adjacent to a root segment of the lip 37, so as to flank it on the side facing the inner ring 5.

According to another aspect of the invention, the signal generating element 19 defined by the insert 19b is delimited towards the L-shaped edge 31 of the end 27 by an obliquely arranged, radially inner lateral surface 43, practically a simple or mixed conical surface and oriented so that the seal 30 for the edge 31 delimited by the annular element 19 is radially flared outwards, on the side where it is frontally open, i.e. towards the joint 6.

A compact overall device structure is thus obtained, with both reduced axial and radial dimensions, easy to manufacture and to mount, without subjecting the parts with a long axial length to peak load. An excellent fluid-tightly sealing of the adjacent areas of the joint and of the wheel hub is equally obtained.

I claim:

1. A static seal device for wheel hubs connected to constant velocity joints comprising:

a first sealing assembly interposed between an inner ring and an outer ring of the wheel hub, and a second sealing assembly integrally supported by the inner ring and arranged straddling the wheel hub and an outer ring of the constant velocity joint, and wherein the first sealing assembly has a first shield anchored to the inner ring by means of a sleeve portion and provided with a flange portion on a first side of the joint, which radially extends so as to protrude from the sleeve portion and towards the outer ring of the wheel hub, externally carrying a signal generating element towards the joint, the signal generating element consisting of an annular insert, and wherein the annular insert is shaped so as to leave uncovered an annular radially inner area of the flange portion, the annular radially inner area being immediately adjacent to a radially outer lateral surface of the inner ring on which the sleeve portion of the first shield and a second end of a tubular core of the second sealing assembly are fitted immediately adjacent to each other, and wherein the inner ring defines an annular seat frontally open towards the joint between itself, the uncovered annular area of the flange portion of the first shield, and the radially outer lateral surface of the inner ring, and wherein the first end of the tubular core of the second sealing assembly faces the opposite side of the joint and is provided radially on the outside with an L-shaped edge, shaped so as to be coupled within the annular seat substantially flushed with a face of the annular insert facing towards the joint.

2. The device according to claim 1, wherein the first end of the tubular core is fluid-tightly coupled to the radially outer lateral surface of the inner ring.

3. The device according to claim 1, wherein the tubular core of the second sealing assembly axially extends so as to protrude from the inner ring towards the constant velocity joint, and wherein the second sealing assembly including an annular seal carried by a second end of the tubular core opposite to the first and made of elastomeric material, and having at least a first elastically deformable, annular lip which radially extends so as to protrude from the second end of the tubular core, inwards the tubular core and from the side opposite to the L-shaped edge of the first end of the tubular core, up to intercept by interference a substantially cylindrical, outer lateral surface of the outer ring of the constant velocity joint, in order to make a sliding radial seal thereon.

4. The device according to claim 3, wherein the annular seal carried by the second end of the tubular core is made of elastomeric material further comprising a second annular lip, which radially extends in the oblique direction so as to protrude from the second end of the tubular core, substantially on the side opposite to the first annular lip and in a position axially retracted towards the first end of the tubular core with respect to the first lip, so as to delimit a frontal annular indentation in the seal and towards the first lip, which is adapted to allow the second lip to work as a centrifuging element with regards to possible contaminants approaching close to the first lip.

5. The device according to claim 4, wherein the second lip is shorter than the first lip and extends in the axial direction up to be flushed to an annular lateral surface frontally delimiting the first lip and facing the side opposite to the inner ring.

6. The device according to claim 4, wherein the second end of the tubular core has a diameter smaller than that of the first end and is connected to the first end by means of an obliquely folded step portion of the core, so as to increase the axial rigidity of the tubular core; the whole second end of the tubular core being embedded into the annular seal belonging to the second sealing assembly.

7. The device according to claim 6, wherein the second end of the annular core is provided radially on the inside with an L-shaped edge, which extends in a direction opposite and parallel to the L-shaped edge of the first end and is embedded in said annular seal, parallel and in an immediately adjacent position to a root segment of the first, elastically deformable annular lip so as to flank it on the side facing the inner ring of the bearing.

8. The device according to claim 1, wherein the annular insert forming the signal generating element is made as an annular insert of predetermined thickness, measured in the axial direction, of a magnetizable elastomeric material, which has been chemically anchored to a first frontal surface of the flange portion of the first shield facing the constant velocity joint, so as to entirely cover it except for the uncovered annular area of the flange portion defining the seat for the L-shaped edge of the second end of the tubular core of the second sealing assembly.

9. The device according to claim 8, wherein the annular insert made of magnetizable elastomeric material extends in the radial direction immediately beyond a radially outer edge delimiting the flange portion of the first shield and, in the axial direction, over the whole thickness of the flange portion and up to a second frontal surface of the flange portion of the first shield, opposite to the first, so that the radially outer edge of the flange portion of the first shield is embedded in the insert.

10. The device according to claim 1, wherein the annular insert defining the signal generating element is delimited towards the L-shaped edge of the first end of the tubular core of the second sealing assembly by a radially inner lateral surface obliquely arranged and oriented so that the seat for the L-shaped edge, delimited by the ring, is radially externally flared on the side on which it is radially open.

* * * * *